United States Patent
Desai

(10) Patent No.: US 10,468,998 B2
(45) Date of Patent: Nov. 5, 2019

(54) METALLIC GLOW DISCHARGE DIODE AND TRIODE DEVICES WITH LARGE COLD CATHODE AS EFFICIENT CHARGE GENERATOR—A POWER CELL

(71) Applicant: Upendra D. Desai, Lanham, MD (US)

(72) Inventor: Upendra D. Desai, Lanham, MD (US)

( * ) Notice: Subject to any disclaimer, the term of this patent is extended or adjusted under 35 U.S.C. 154(b) by 0 days.

(21) Appl. No.: 16/017,442

(22) Filed: Jun. 25, 2018

(65) Prior Publication Data
US 2019/0140561 A1 May 9, 2019

Related U.S. Application Data

(63) Continuation of application No. 15/404,317, filed on Jan. 12, 2017, now Pat. No. 10,049,864.

(51) Int. Cl.
*H01J 17/40* (2006.01)
*H02N 3/00* (2006.01)

(52) U.S. Cl.
CPC ............... *H02N 3/00* (2013.01); *H01J 17/40* (2013.01); *Y10S 74/09* (2013.01)

(58) Field of Classification Search
CPC ......... H02N 3/00; H02N 11/008; H01J 17/40; Y10S 74/09
See application file for complete search history.

(56) References Cited

U.S. PATENT DOCUMENTS

| | | | | | |
|---|---|---|---|---|---|
| 2,590,863 | A * | 4/1952 | Jacobs | ............. | H01J 17/38 313/251 |
| 2,926,277 | A * | 2/1960 | White | ............. | H01J 17/066 313/339 |
| 4,682,564 | A * | 7/1987 | Cann | ............. | H05H 1/54 118/50.1 |
| 5,006,706 | A * | 4/1991 | Marcus | ............. | G01N 21/68 250/281 |
| 5,410,425 | A * | 4/1995 | Rhodes | ............. | G02F 1/0327 359/254 |
| 5,457,298 | A * | 10/1995 | Nelson | ............. | H01J 37/32082 156/345.46 |
| 5,502,354 | A * | 3/1996 | Correa | ............. | H01J 17/063 315/111.01 |
| 5,569,976 | A * | 10/1996 | Gavrilov | ............. | H01J 27/14 313/231.31 |
| 6,433,480 | B1 * | 8/2002 | Stark | ............. | H01J 61/09 313/306 |
| 7,768,267 | B2 * | 8/2010 | Knott | ............. | H01J 41/02 250/397 |
| 7,893,408 | B2 * | 2/2011 | Hieftje | ............. | G01N 27/62 250/288 |
| 8,878,422 | B2 * | 11/2014 | Mattausch | ............. | H01J 3/025 313/11 |
| 10,049,864 | B2 * | 8/2018 | Desai | ............. | H02N 3/00 |

\* cited by examiner

*Primary Examiner* — Michael C Zarroli

(57) ABSTRACT

The invention describes a metal container that comprises a cathode containing an insulated anode with gases at pressures less than a fraction (0.1-0.9) of a mmHg. Metallic normal glow discharge diode and triode devices with large cold cathode area as efficient charge generator to function as a power cell. A metallic glow discharge device comprising a cylindrical cathode and a coaxial insulated anode containing gas at very low pressure utilizing radial electric field. A metallic normal glow discharge diode device containing a planar geometry, with an insulated metallic plate parallel to the broad side of the container forms the anode, while the container acts as the cathode.

26 Claims, 3 Drawing Sheets

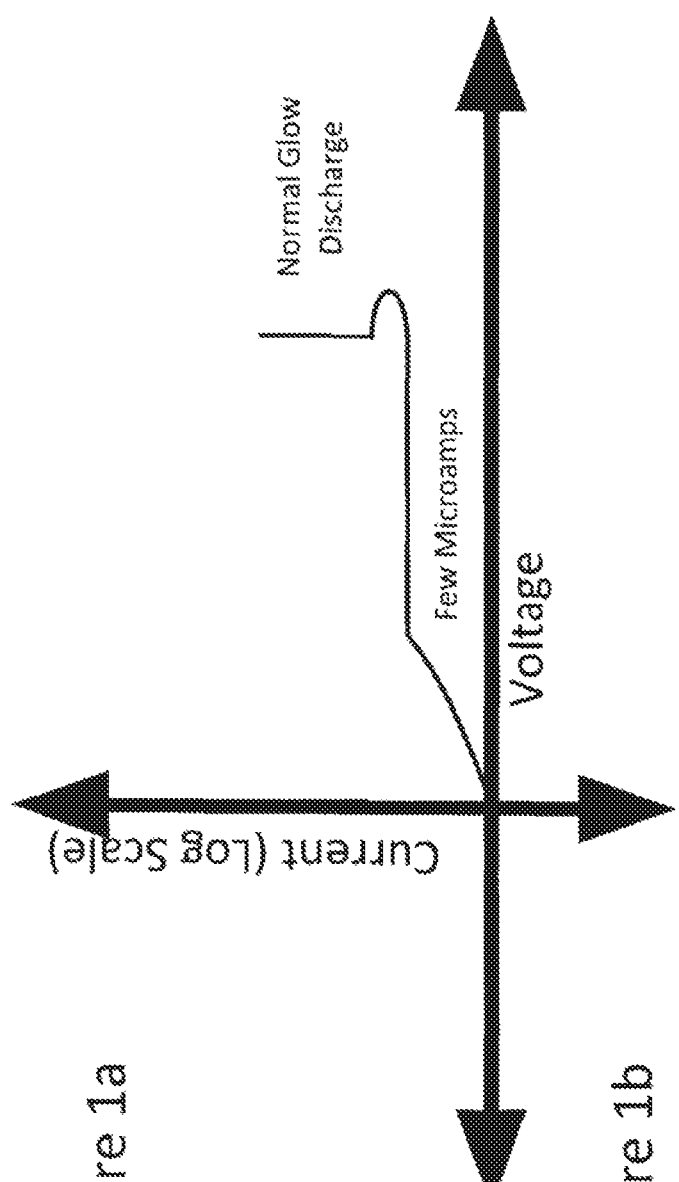
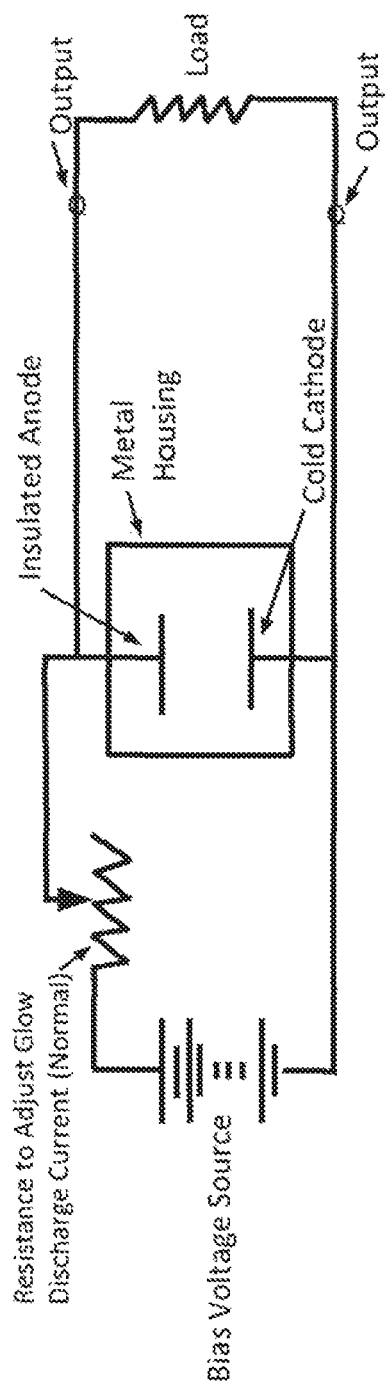
Figure 1a
Figure 1b

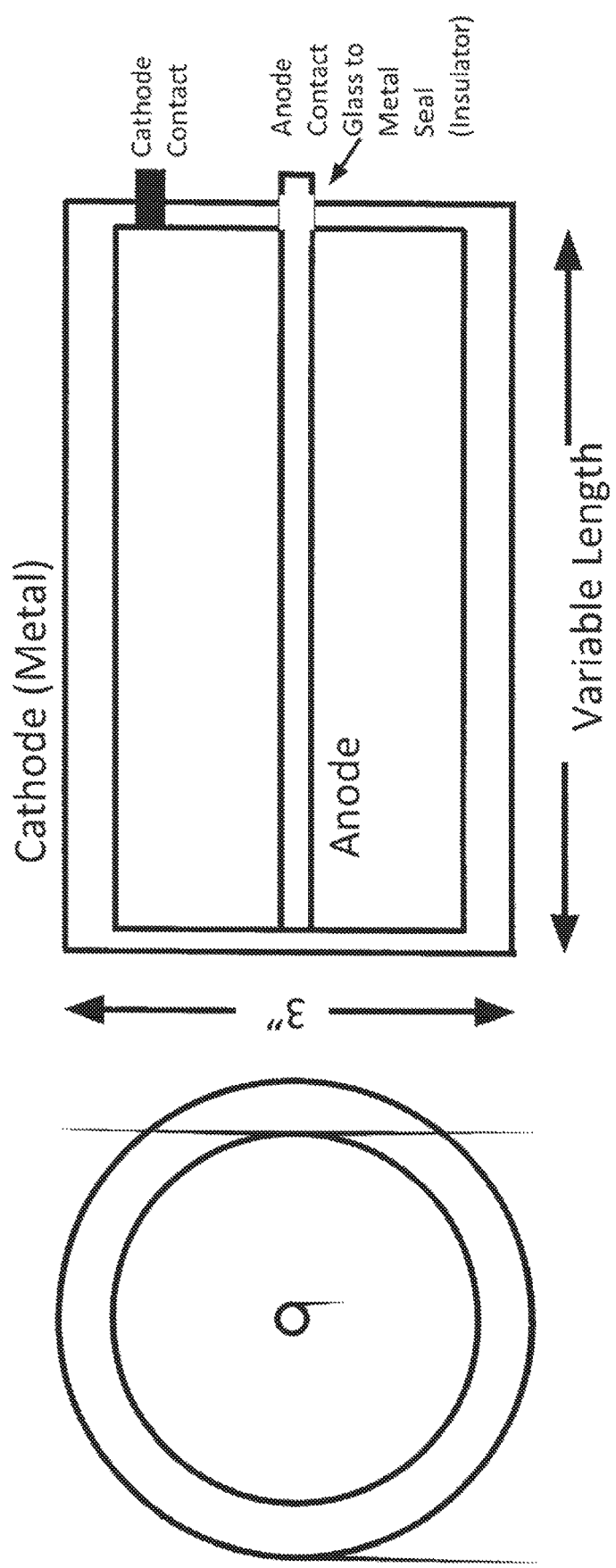
Figure 2. Radial Field Configuration

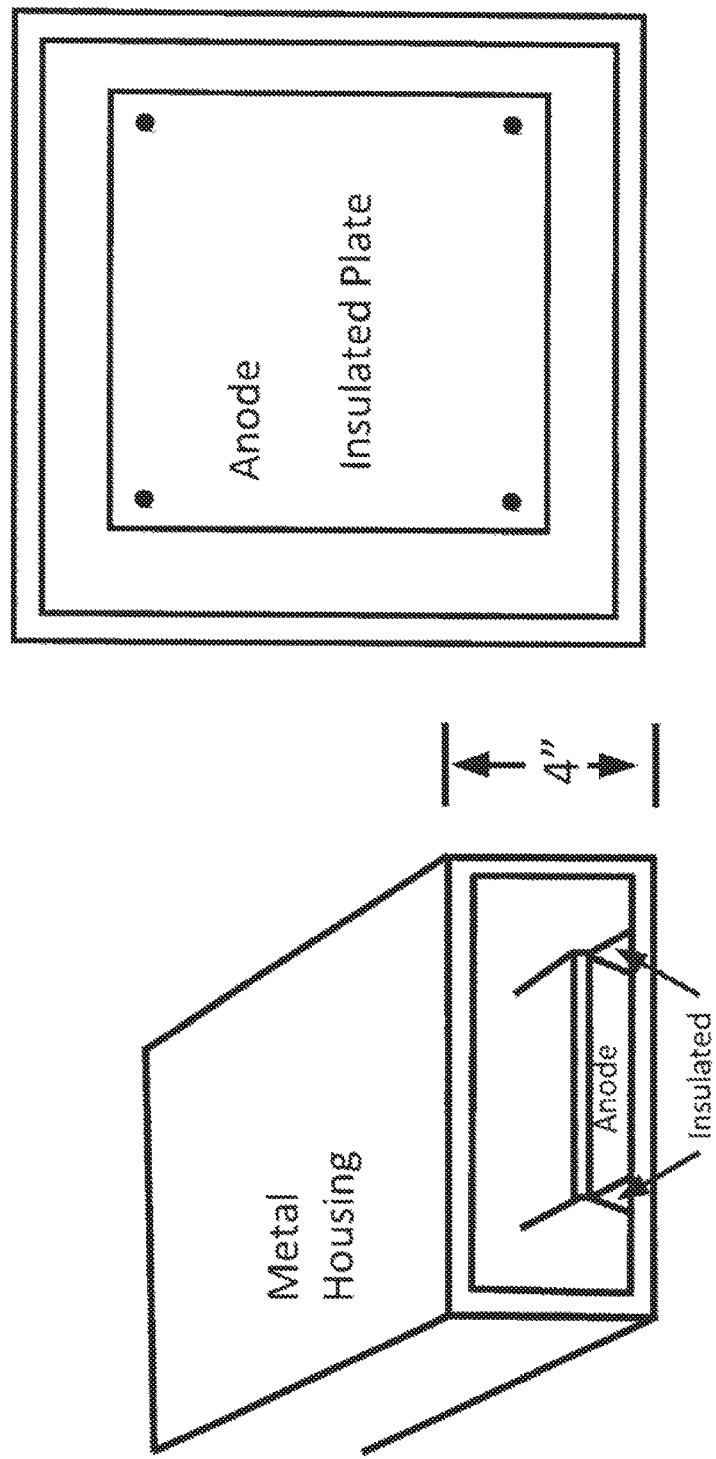
Figure 3. Uniform Field Configuration

METALLIC GLOW DISCHARGE DIODE AND TRIODE DEVICES WITH LARGE COLD CATHODE AS EFFICIENT CHARGE GENERATOR—A POWER CELL

RELATED APPLICATIONS

This application claims the benefit of U.S. patent application Ser. No. 15/404,317, filed Jan. 12, 2017, which application is hereby incorporated by reference in its entirety.

The invention describes a metal container that comprises a cathode containing an insulated anode with gases at pressures less than a fraction (0.1-0.9) of a mmHg. The metallic container provides for basic normal glow discharge devices. Even though gas molecules are continuously moving following Brownian motion, since they are neutral the gases don't carry electrical current. If an electron is generated by cosmic rays or the photoelectric effect at this low pressure of the confined gas, the electron will have a mean free path of approximately a cm or so. Under the action of an electric field, the electron will gain sufficient energy to ionize further neutral gas molecules. Creating an electron and an ion pair, which under the influence of the electric field will further ionize the gas. In gaseous discharge ionization, recombination and meta-stable states occurs generating photons when the excited ions returns to the neutral state which trigger photo-electrons from a cathode. This process generates electrons, ions and neutral molecules continuously. The low pressure of the gas and the low mass electrons migrate towards the anode rapidly, while the heavier positively charged ions migrate towards the cathode slowly. By virtue of this a plasma of electrons and ions surrounds the anode. This is a typical characteristic of "normal glow" discharge. A glow discharge is considered to be "normal" until the glow covers the whole cathode area.

BRIEF DESCRIPTION OF THE DRAWINGS

FIG. 1a. A current-voltage (I-V) graph showing an exemplification of "normal glow" discharge. At low voltage there is microampere current, then at striking voltage an increase current occurs without a corresponding increase in voltage. This phenomenon is known as "normal glow" discharge.

FIG. 1b. A characteristic circuit configuration, wherein a DC bias supply source, a series resistor, which controls the current and the diode device connected to an external load.

FIG. 2. Radial Field Configuration of the cold cathode metal "normal glow" discharge device. A cylindrical cathode and a coaxial insulated anode containing gas at very low pressure. The distance between the anode and cathode illustrated is 3 cm. Therefore, the diameter of the cylinder would be about 6 cm. The length of the cylinder and anode is variable and depends on the load current requirement.

FIG. 3. Planar Configuration of the cold cathode metal "normal glow" discharge device. The distance between the anode and cathode would be approximately 4 cm. The height of the planar box would be approximately 8 cm. The area of the broadside could be 1 sq meter or greater.

DETAILED DESCRIPTION

FIG. 1 shows the characteristic circuit configuration of such devices. A DC bias supply source, a series resistor which controls the current and the diode device. The larger the cathode area the larger the plasma with an increased number of ions and electrons surrounding the anode. A small fraction of these charged particles are required to sustain the glow discharge phenomenon, while the rest of the charged particles which are generated due to the electrical field working on gas molecules are available to drive an external load and not draining any additional current from the bias supply. The ratio of sustaining glow discharge current to the current supplied to load could be as high as 10 times.

Two (2) configurations for making such devices are disclosed by FIGS. 2 and 3. A cylindrical cathode and a coaxial insulated anode containing gas at very low pressure utilizing radial electric field approximately 1 meter in length. The "normal glow" discharge phenomenon occurs at voltages which are multiples of the first ionization potential of the gas mixture. That can be between 70-300 volts depending upon the geometry and the nature of the gas. The other configuration is planar. Where normal electric field will be effective. The anode is an insulated metal plate parallel to the broadside of the container. The container acts as the cathode. In both configurations the distance between the anode and cathode can be but not limited to approximately 3-4 cm. Therefore the diameter of the cylinder would be about 6-8 cm. The height of the planar box would be approximately 6-8 cm. In the cylindrical configuration a practical length would be approximately 1 m. For the planar configuration the area can be 1 sq meter or greater on the broadside.

This invention of generating a power cell opens opportunity for small or large scale electrical efficient power generation. The concept is very simple to execute and would provide units at very low costs as well as non-polluting. Since the gas is at very low pressures the structural strength of the units would be very light and there would be low chance of leakage of the gas. The small scale application one could use both in developed as well as developing countries for charging lithium ion or NiCAD batteries. The batteries in a series configuration are charged. The charged cells operating at low voltage (3.2 V) could operate light emitting diode devices efficiently and further a new concept of home wiring could be used at low DC voltage.

From the foregoing description, it will be apparent that variations and modifications may be made to the invention described herein to adopt it to various usages and load conditions. Such embodiments are also within the scope of the following claims.

I claim:

1. A method of charging a lithium ion battery using a metallic normal glow discharge device comprising a cold cathode containing an insulated anode with a gas in the area between the insulated anode and the cathode at pressures less than or equal to 1 mmHg.

2. The method of claim 1, wherein the cathode is cylindrical and the anode coaxial to the cathode utilizing radial electric field.

3. The method of claim 2, wherein the metallic glow discharge device length is 1 meter.

4. The method of claim 1, wherein the metallic normal glow discharge device has a planar geometry, where the anode is an insulated metallic plate parallel to the broadside of the container and the container acts as the cathode.

5. The method of claim 4, wherein the area of the plane parallel to the anode can be 1 square meter or greater.

6. The method of claim 1, wherein the distance between the anode and cathode would be approximately 3-4 cm.

7. A method of charging a lithium ion battery using a metallic normal glow discharge diode device comprising a cold cathode containing an insulated anode with a gas in the area between the insulated anode and the cathode at pressures less than or equal to 1 mmHg.

8. The method of claim 7, wherein the cathode is cylindrical and the anode coaxial to the cathode utilizing radial electric field.

9. The method of claim 7, wherein the metallic normal glow discharge diode device has a planar geometry, where the anode is an insulated metallic plate parallel to the broadside of the container and the container acts as the cathode.

10. The method of claim 9, wherein the area of the plane parallel to the anode can be 1 square meter or greater.

11. The method of claim 7, wherein the distance between the anode and cathode in the metallic glow discharge diode device would be approximately 3-4 cm.

12. A method of charging a lithium ion battery using a metallic normal glow discharge device comprising a cold cathode containing an insulated anode with gases in the area between the insulated anode and the cathode at pressures less than or equal to 1 mmHg.

13. The method of claim 12, wherein the cathode is cylindrical and the anode coaxial to the cathode utilizing radial electric field.

14. The method of claim 13, wherein the metallic glow discharge device length is 1 meter.

15. The method of claim 12, wherein the metallic glow discharge device having a planar geometry, where the anode is an insulated metallic plate parallel to the broadside of the container and the container acts as the cathode.

16. The method of claim 15, wherein the area of the plane parallel to the anode can be 1 square meter or greater.

17. The method of claim 12, wherein the distance between the anode and cathode would be approximately 3-4 cm.

18. A method of charging a lithium ion battery using a metallic normal glow discharge diode device comprising a cold cathode containing an insulated anode with gases in the area between the insulated anode and the cathode at pressures less than or equal to 1 mmHg.

19. The method of claim 18, wherein the cathode is cylindrical and the anode coaxial to the cathode utilizing radial electric field.

20. The method of claim 18, wherein the metallic glow discharge diode device having a planar geometry, where the anode is an insulated metallic plate parallel to the broadside of the container and the container acts as the cathode.

21. The method of claim 20, wherein the area of the plane parallel to the anode can be 1 square meter or greater.

22. The method of claim 18, wherein the distance between the anode and cathode would be approximately 3-4 cm.

23. A method of charging a lead acid battery using a metallic normal glow discharge device, wherein said metallic normal glow discharge device comprises a cold cathode containing an insulated anode with a gas in the area between the insulated anode and the cathode at pressures less than or equal to 1 mmHg.

24. A method of charging a lead acid battery using a metallic normal glow discharge diode device, wherein the metallic normal glow discharge diode device comprising a cold cathode containing an insulated anode with a gas in the area between the insulated anode and the cathode at pressures less than or equal to 1 mmHg.

25. A method of charging a lead acid battery using a metallic normal glow discharge device, wherein the metallic normal glow discharge device comprises a cold cathode containing an insulated anode with gases in the area between the insulated anode and the cathode at pressures less than or equal to mmHg.

26. A method of charging a lead acid battery using a metallic normal glow discharge diode device, wherein the metallic normal glow discharge diode device comprises a cold cathode containing an insulated anode with gases in the area between the insulated anode and the cathode at pressures less than or equal to 1 mmHg.

* * * * *